United States Patent [19]

Okamoto

[11] Patent Number: 4,609,430

[45] Date of Patent: Sep. 2, 1986

[54] LIQUID MATERIAL DRYING APPARATUS

[75] Inventor: Magoji Okamoto, Nagoya, Japan

[73] Assignee: NGK Insulators, Ltd., Nagoya, Japan

[21] Appl. No.: 707,678

[22] Filed: Mar. 4, 1985

[30] Foreign Application Priority Data

Mar. 7, 1984 [JP] Japan .................................. 59-44724
Jun. 27, 1984 [JP] Japan .................................. 59-133549
Jun. 27, 1984 [JP] Japan .................................. 59-133550

[51] Int. Cl.[4] .................................................. B01D 1/24

[52] U.S. Cl. .......................................... 159/29; 34/109; 34/168; 34/169

[58] Field of Search ................. 159/DIG. 29, 29, 1 R; 34/9, 17, 13, 33, 56, 66, 109, 168, 169; 209/3; 241/2, 24

[56] References Cited

U.S. PATENT DOCUMENTS 3,898,745 8/1975 Carlsson ..................... 159/DIG. 29

*Primary Examiner*—Frank Sever

*Attorney, Agent, or Firm*—Parkhurst & Oliff

[57] ABSTRACT

An apparatus for drying and powdering liquid radioactive wastes produced in radioactive material treating plants such as nuclear power stations comprising a vessel having liquid material inlet and outlet ports for liquid wastes, a support plate arranged in the vessel, a great number of spherical bodies piled in layers on the support plate, stirring means having stirring blades for rolling the spherical bodies, and heating means for heating the spherical bodies. An induction heating coil may be used as the heating means, when the spherical bodies are conductive. If electric resistance heating means is used, the spherical bodies are non-conductive. Hot air can be used for heating the spherical bodies. The electric resistance heating means consists of a plurality of resistance heaters one above the other around the vessel. The support plate is formed with slits concentric to each other and the stirring means is provided with pins rotating therewith and extending into the slits.

10 Claims, 9 Drawing Figures

LIQUID MATERIAL DRYING APPARATUS

BACKGROUND OF THE INVENTION

1. Field of the Invention

This invention relates to an apparatus for drying liquid materials as slurries to transform them into powders with the aid of heated spherical bodies, particularly suitble for powdering various kinds of liquid radioactive wastes produced in radioactive material treating plants such as nuclear power stations.

2. Description of the Prior Art

Radioactive waste materials as radioactive waste liquids, resins, sludges and the like produced in radioactive material treating plants such as nuclear power stations are treated or stored in accordance with their characteristic properties. For example, the radioactive waste liquids are enriched in evaporators to obtain enriched waste liquids which are stored as liquids or mixed with cement or asphalt to solidify in drum cans which are then stored in the plants. The waste resins and sludges are stored in slurry tanks or extracted in centrifugal hydro-extractors and then mixed with cement to solidify in drum cans which are also stored in the plants.

However, these methods are low in storing efficiency requiring a great number of storage tanks or drum cans. To avoid this, it has been proposed that after the enriched waste liquids, waste resins and waste sludges are evaporated, dried and powdered in centrifugal membrane drying apparatuses, the powders are formed in pellets or mixed with asphalt or plastic materials to solidify, thereby reducing the volumes of the wastes.

However, these drying apparatuses have the following disadvantages. Scraping blades provided in the drying apparatuses are rotated at high speeds, so that they are susceptible to wear of parts and vibration resulting in failure or trouble, requiring troublesome and expensive inspection and exchange of parts. Moreover, dried powders often stick to the blades and rotating shafts and grow, so that it requires operators to stop the apparatuses with constant intervals and clean the inner parts of the apparatuses with hot water. Accordingly, it is difficult to operate the apparatuses for long periods of time. Furthermore, as the apparatuses employ externally indirect heating system and temperatures of steam as heat source are lower than 200° C., the efficiency of heat transfer is low and the treating capacity of the apparatuses is small so that the radioactive waste liquids prior to being enriched cannot be directly powdered. In case of treating enriched waste liquids mainly consisting of boric acid and sodium hydroxide produced from pressurized water nuclear power stations, particularly, it is required to adjust the mixed ratio of the boric acid and sodium hydroxide in constant narrow ranges before drying and treating the water liquids, because the mixed ratio for powdering is dependent upon drying or treating temperatures in a manner that the range of allowable mixed ratio is the widest at about 350° C. gut as the temperature is lower, the range becomes narrower. It is difficult to powder the enriched waste liquids when the drying temperature is lower than 200° C.

SUMMARY OF THE INVENTION

It is therefore a principal object of the invention to provide a liquid material drying apparatus which overcomes the above disadvantages of the prior art.

In order to achieve this object, the liquid material drying method according to the invention comprises steps of rolling spherical bodies piled on a support plate in a vessel, heating said spherical bodies, and supplying a liquid material onto said spherical bodies so as to heat the liquid material to dry it.

It is another object of the invention to provide a liquid material drying apparatus which is relatively simple and inexpensive to manufacture and easy to maintain with less failure or trouble and operates for stable treating of waste liquids for long periods of time.

In order to achieve this object, the liquid material drying apparatus according to the invention comprises a main body in the form of a vessel provided at upper and lower portions with liquid material inlet and outlet ports for said liquid material, a support plate arranged in said vessel, a great number of spherical bodies piled in layers on said support plate, stirring means having stirring blades for rolling said spherical bodies, and heating means for heating said spherical bodies.

The apparatus preferably comprises moisture removing means for removing moisture derived from the liquid material to prevent the moisture from becoming saturated condition.

The heating means may be an induction heating coil or electric resistance heating means or may utilize hot air.

When the induction heating coil is used, it is impossible to effect a required temperature distribution in the piled layers of the spherical bodies in vertical directions. At the beginning of the operation of the drying apparatus, there is a risk of the spherical bodies made of ceramics in upper layers being cracked due to difference in temperature because all the piled layers of the spherical bodies are preheated to relatively high temperatures. In normal operation, it is impossible to adjust the temperature of all the piled layers of the spherical bodies to the optimum temperature for powdering the liquid material in accordance with amounts of the material to be treated, contents of components, temperatures and the like, so that the spherical bodies are over-heated to waste the supplied heating energy or to dry the material insufficiently so as to obtain wetted powder which is likely to clog apertures of the support plate.

In order to solve these problems, the electric resistance heating means preferably comprises a plurality of electric resistance heaters arranged around the vessel and one above the other so as to heat zones of the spherical bodies corresponding to the respective heaters in different temperatures in a manner that the higher the zone of the spherical bodies, the lower is the temperature, thereby controlling the temperature distribution in the piled layers of the spherical bodies.

In order to more positively prevent clogging of the apertures of the support plate, the support plate is preferably formed with slits concentric to each other about a driving shaft of the stirring means, and the driving shaft is provided with pins rotating therewith and extending into the slits.

In a preferred embodiment, the support plate comprises a number of annular bodies having different diameters and arranged concentrically and equally spaced apart from each other to form a plurality of concentric slits therebetween and a plurality of ribs connected to undersides of the annular bodies, and the lowermost stirring blade nearest to the support plate is provided with pins extending into the slits.

The slits may have substantially the same widths in vertical direction or may be widened downward to facilitate removing the clogged material. The pins are preferably fixed to the stirring blade so as to tilt downward in the rotating direction.

In order that the invention may be more clearly understood, preferred embodiments will be described, by way of example, with reference to the accompanying drawings.

DETAILED DESCRIPTION OF THE PREFERRED EMBODIMENT

Figure 1:
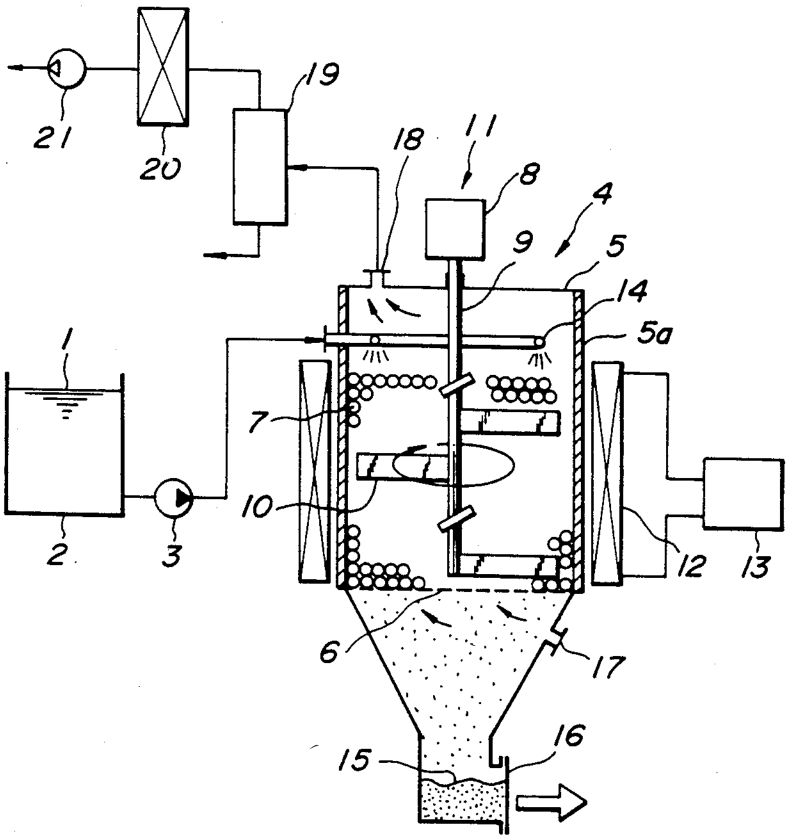
FIG. 1 is a longitudinal sectional view of a first embodiment of the liquid material drying apparatus according to the invention.

Referring to FIG. 1 illustrating a first preferred embodiment of the apparatus according to the invention, a liquid material 1 such as radioactive waste liquid, enriched waste liquid or slurry of waste resin and waste sludge is supplied from a tank 2 into the apparatus 4 by means of a pump 3. The apparatus 4 comprises a main body 5 in the form of a vessel whose barrel 5*a* is made of a non-conductive material. In the main body 5 is provided a support plate 6 formed with a great number of apertures, on which a great number of spherical conductors 7 made of a stainless steel or the like are piled. The spherical conductors 7 are continuously stirred or agitated by stirring means 11 comprising stirring blades 10 fixed to a vertical rotating shaft 9 driven by rotatively driving means 8.

Around the barrel 5*a* of the main body 5 is arranged an induction heating coil 12 which is supplied with high-frequency current from a high-frequency generator 13 to directly heat the spherical conductors 7 by the electromagnetic induction.

The liquid material, fed into the apparatus 4 drops onto the piled layers of the spherical conductors 7 from liquid supply means 14 having nozzles opening above the spherical conductors 7 and flows downward along surfaces of the induction heated spherical conductors 7. During such a downward flowing, the liquid material 1 is heated by direct heating of the high temperature spherical conductors 7 and by heating of high temperature atmosphere in spaces between the spherical conductors heated by them to transform into powder 15 which falls downward and is removed from a powder outlet 16 provided at a bottom of the main body 5.

In order to prevent the steam in the main body from becoming saturated upon the powdering of the material, on the other hand, air for removing moisture is forced through an air supply port 17 provided at the lower portion into the main body 5 to carry away the evaporated moisture in the proximity of the spherical conductors 7 toward an exhaust port 18 provided at an upper portion of the main body 5. After flowing out the exhaust port 18, the moisture condenses in a condenser 19 so as to be collected. The air from which the moisture has been removed is fed into a dust collector 20 in which the dust included in the air is removed. Thereafter, the air is exhausted into the atmosphere by an exhaust fan 21.

Example

A solution including 20 weight % of $Na_2SO_4$ as a main component was supplied at a rate of 8 kg/hr onto piled layers of spherical conductors 7 which were about 80 lit stainless steel balls having diameters of 20 mm in the above apparatus. High frequency current of 180 Hz was supplied to the coil 12 by means of the high-frequency generator 13 whose output was 30 kw so as to heat the spherical conductors 7 by the induction heating to maintain the maximum temperature in the main body 5 at approximately 400° C. The rotating shaft 9 was rotated at 3 revolutions per minute so as to roll the spherical conductors 7 to dry the solution. The evaporated moisture was exhausted out of the main body 5 by means of the air of 10 $Nm^3$/hr. As a result, powder 15 removed from the powder outlet 16 was dried up to less than 1% of moisture content. Dried powder contained in the exhaust gas from the exhaust port 18 was less than 1% of the powder 15.

This invention is not limited to the above embodiment. For example, the spherical conductors 7 may be conductive materials other than the stainless steel. The main body 5 may be made of materials other than non-conductive materials except of the barrel 5*a* in opposition to the induction heating coil 12. The frequency of the high-frequency current for the induction heating may be selected depending upon the specific resistance and relative permeability or permittivity of the spherical conductors without limiting to 180 Hz. It is preferable to select relatively low frequencies as 180–500 Hz. Moreover, the gas for removing the evaporated moisture in the barrel 5*a* may be gases other than the above mentioned air.

Figure 2:
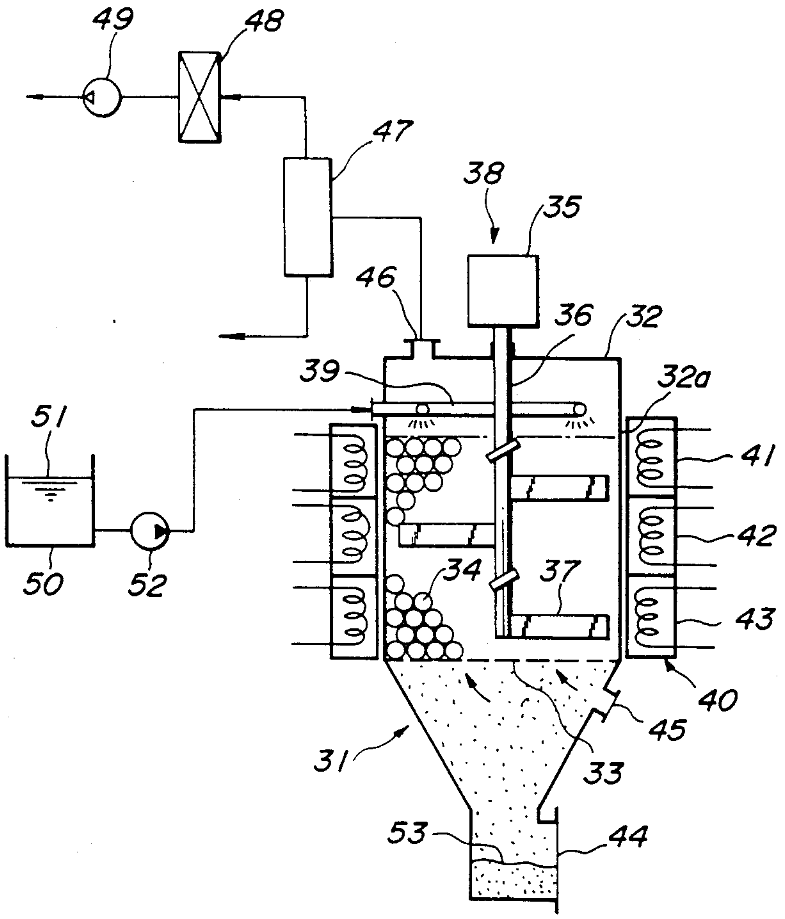
FIG. 2 is a longitudinal sectional view of a second embodiment of the liquid material drying apparatus according to the invention.
Figure 3:
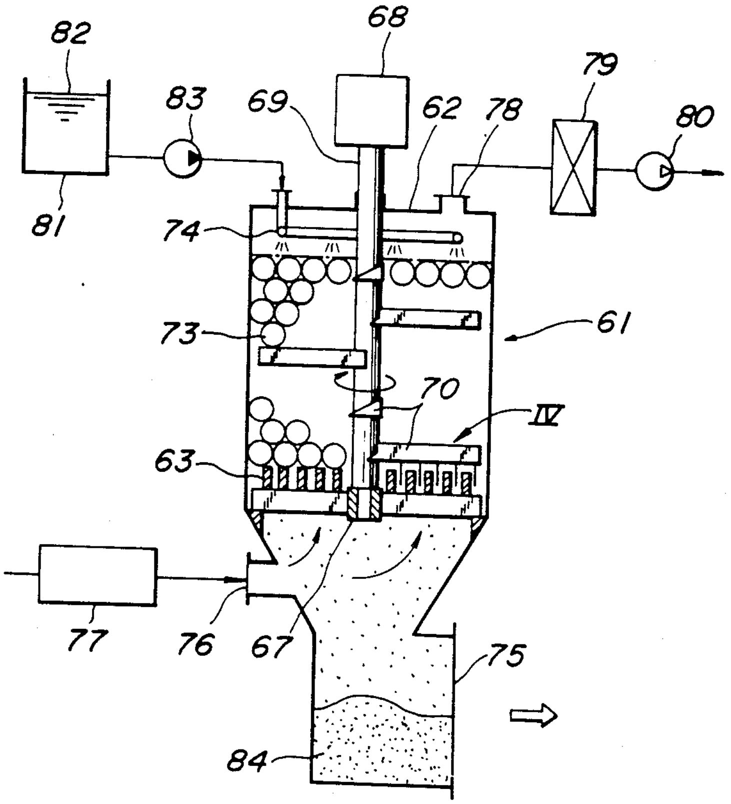
FIG. 3 is a longitudinal sectional view of a third embodiment of the liquid material drying apparatus according to the invention.

Referring to FIG. 2 illustrating a second preferred embodiment of the invention in consideration of temperature distribution in piled layers of spherical bodies, a drying apparatus comprises a main body 32 in the form of a vessel made of a stainless steel or the like in which a support plate 33 made of a stainless steel or the like is fixed thereto. The support plate 33 is formed with a number of apertures or slots enabling the powder to pass therethrough, or made of a grate or grid. A great number of spherical bodies 34 preferably made of a ceramic material are piled on the support plate 33 and continuously stirred or agitated by stirring means 38 comprising stirring blades 37 fixed to a vertical rotating shaft 36 driven by rotatively driving means 35.

Liquid supply means 39 having nozzles is fixed to the main body 32 above the layers of the spherical bodies 34. Around the barrel 32*a* of the main body 32 are provided resistance heaters 40 which are divided from the uppermost to the lowermost into first, second and third zones 41, 42 and 43 connected to a power source through separate current or voltage regulators (not shown). The main body 32 further comprises a powder outlet 44, an air supply port 45 below the support plate 33, and an exhaust port 46 in the upper portion of the main body 32, to which are connected a condenser 47, a dust collector 48 and an exhaust fan 49. To the liquid supply means 39 is connected a pump 52 for supplying the liquid material 51 in a tank 50 into the main body.

With this arrangement, the liquid material 51 consisting of radioactive waste liquids, enriched waste liquids, slurries of sludges, and the like is supplied through the liquid supply means 39 onto the spherical bodies 34 and flows downward along surfaces of the spherical bodies 34 heated by the resistance heaters 40. During this downward flowing, the liquid material 21 is heated and dried so as to be transformed into powder 53 which falls through the support plate 33.

During such an operation, different electric currents or voltages are supplied to the first, second and third zones 41–43 of the resistance heaters 40 so as to maintain at different heating temperatures the spherical bodies 34 in the upper, middle and lower portions of the main body 32 corresponding to the first, second and third zones of the heaters. These heating temperatures are determined such that the material 23 can be dried to the minimum moisture content with minimum electric power. In experiments of inventors, good results were generally obtained by maintaining the spherical bodies 34 in the upper, middle and lower portions of the main body 32 at relatively low temperatures 100°–200° C., intermediate temperatures 200°–300° C. and relatively high temperatures 300°–400° C., respectively. In this case, as the difference in temperature between the liquid material 51 and the spherical bodies 34 in the upper portion of the main body 32 is little, cracks in the spherical bodies scarcely occur even if the spherical bodies are of a ceramic material. Moreover, as the spherical bodies 34 in the lower portion of the main body 32 are at the relatively high teperatures, the material 23 is sufficiently dried. As the temperature in the apparatus is at the most 400° C., materials of respective parts of the apparatus can be easily selected because there are comparatively many heat-resistant materials capable of being used with radioactive materials. The moisture evaporated as the liquid material 51 is dried is carried through the exhaust port 46 along with air sucked through the air supply port 45 of the main body 32 for removing the moisture and then condenses in the condenser 47 so as to be collected. The air from which the moisture has been removed is fed into the dust collector 48 in which the dust included in the air is removed. The air is then exhausted into the atmosphere by the exhaust fan 49.

In this embodiment, the heaters 40 for heating the spherical bodies 34 may be high-frequency induction heaters as in the first embodiment. In this case, the spherical bodies 34 are preferably made of a conductive material such as stainless steel, and the barrel 32_a_ of the main body 32 is preferably made of a non-conductive material as in the first embodiment. Although the heaters 40 have been explained to be constructed by the three zones, they may have two zones one above the other or plural zones more than three.

Figure 4:
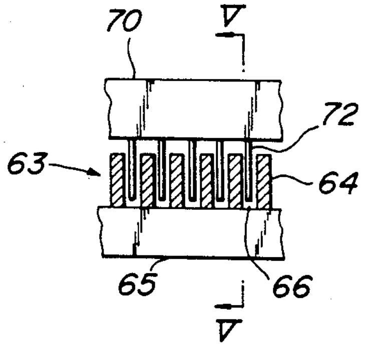
FIG. 4 is an enlarged view of the portion IV in FIG. 3.
Figure 5:
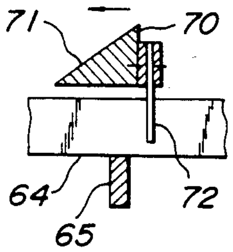
FIG. 5 is a sectional view taken along the line V—V in FIG. 4.
Figure 6:
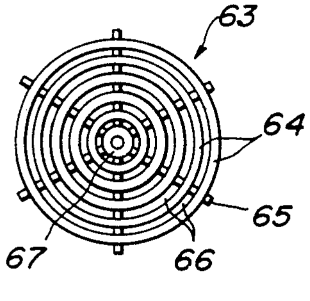
FIG. 6 is a plan view of the support plate of the apparatus shown in FIG. 3.

Referring to FIGS. 3–6 illustrating a third embodiment of the invention constructed particularly so as to prevent apertures of a support plate from clogging, a drying apparatus 61 comprises a main body 62 in the form of a vessel made of a stainless steel or the like in which a support plate 63 made of a stainless steel or the like is fixed thereto. The support plate 63 comprises a number of annular bodies 64 having different diameters and arranged concentrically and equally spaced apart from each other to form a plurality of concentric slits 66 therebetween and a plurality of ribs 65 connected to undersides of the annular bodies 64 (FIG. 6). In a center of the support plate 63 is provided a bearing 67 in which is loosely fitted a lower end of a vertical driving shaft 69 driven by rotatively driving means 68. To the driving shaft 69 are fixed a plurality of stirring blades 70 made of a stainless steel each in the form of a bar having a triangular cross-section including an upper surface 71 downward oblique in its rotating direction. The lowermost stirring blade 70 nearest to the support plate 63 is provided with pins 72 fixed thereto as shown in FIGS. 4 and 5. Each pin 72 has a cross-section smaller than the width of the slit 66 so as to be inserted between the slits 66 and has its lower end stopping short of an upper surface of the ribs 65.

A great number of spherical bodies 73 preferably made of a ceramic material are piled on the support plate 63. Liquid supply means 74 having nozzles is provided in an upper portion of the main body 62 so as to open the nozzles above the spherical bodies 73. The main body 62 comprises a powder outlet 75 at a lower end of the main body 62, an air supply port 76 provided in the main body below the support plate 63 and connected to hot air producing means 77, and an exhaust port 78 provided in the upper portion of the main body 62 and connected to a dust collector 79 and an exhaust fan 80. A pump 83 is connected to the liquid supply means 74 for supplying into the main body a liquid material 82 in a tank 81.

With this arrangement, the liquid material 82 consisting of radioactive waste liquids, enriched waste liquids, slurries of sludges and the like is supplied through the liquid supply means 74 by means of the pump 83 onto the piled layers of the spherical bodies 73. The liquid material flows downward along surfaces of the spherical bodies 73 heated by hot air at temperatures more than 200° C. from the hot air producing means 77. During this downward flowing, the liquid material is dried by the surfaces of the spherical bodies and the hot air to be converted into powder 84 further flowing downward.

In the event that the liquid material 82 is slurry or the like, the powder 84 often passes through the support plate 63 under insufficiently dried condition. In this case, there is a tendency of the powder 84 to stick and accumulate in the slits 66 of the support plate 63. However, the pins 72 are always driven by the driving shaft 69 to rotatively move in the slits 66 so as to scrape off the accumulated powder in the slots, thereby preventing the clogging of the slots. If the spherical bodies 73 are cracked or broken, the pins 72 prevent fragments of the broken spherical bodies from clogging the slits 66 in the same manner as above described so as to drop the small fragments through the slits 66. The large fragments incapable of passing through the slits still move on the support plate 63 to serve to dry the material together with the other sound spherical bodies 73. On the other hand, the hot air including the evaporated moisture flows through the exhaust port 78 into the dust collector 79 in which the dust included in the hot air is removed. The air is then exhausted into the atmosphere by the exhaust fan 80.

Figure 7:
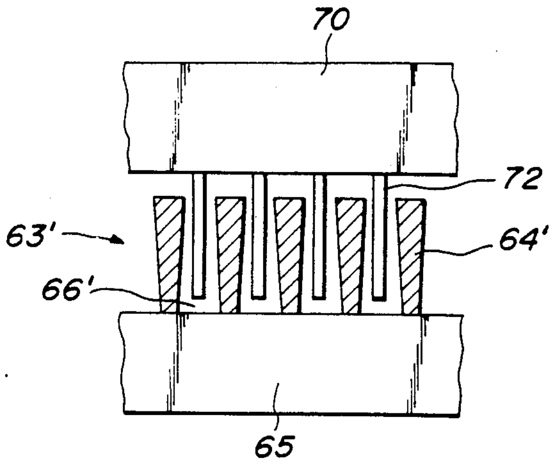
FIG. 7 is an enlarged sectional view of part of a modified support plate according to the invention.
Figure 8:
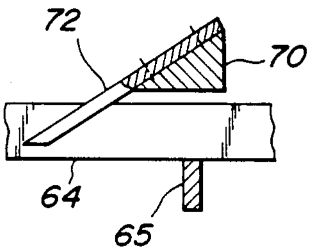
FIG. 8 is a sectional view illustrating modified pins according to the invention.

In the above embodiment, the slits 66 have the same width in a vertical direction. As shown in FIG. 7, however, a support plate 63' is made by downward tapered annular bodies 64' to form downward widened slits 66' so as to more facilitate the removing the sticked powder from sidewalls of the slits 66', thereby improving the clogging preventing effect. Moreover, it is preferable to fix the pins 72 to the stirring blade 70 so as to tilt downward in the rotating direction in order to securely scoop and remove the powder 84 and fragments of the spherical bodies 73 firmly fixed to the sidewalls of the slits 66. Furthermore, the pins 72 may directly extend from undersides of the stirring blade 70. Moreover, a bar for carrying the pin 72 may be provided on the driving shaft 69 without providing pins on the lowermost stirring blade.

In the above embodiment, moreover, as the upper surface 71 of the stirring blades 70 are downward tilted in their rotating directions, the resistance of the spherical bodies 73 against the blades becomes small to reduce the power of the driving means 68 for driving the blades, and the spherical bodies 73 and also the fragments thereof are easily scooped by the tilted upper surfaces of the stirring blades 70, thereby preventing the fragments from jamming between the stirring blade 70 and the annular bodies 64. Other shapes of the stirring blades may of course be used.

Figure 9:
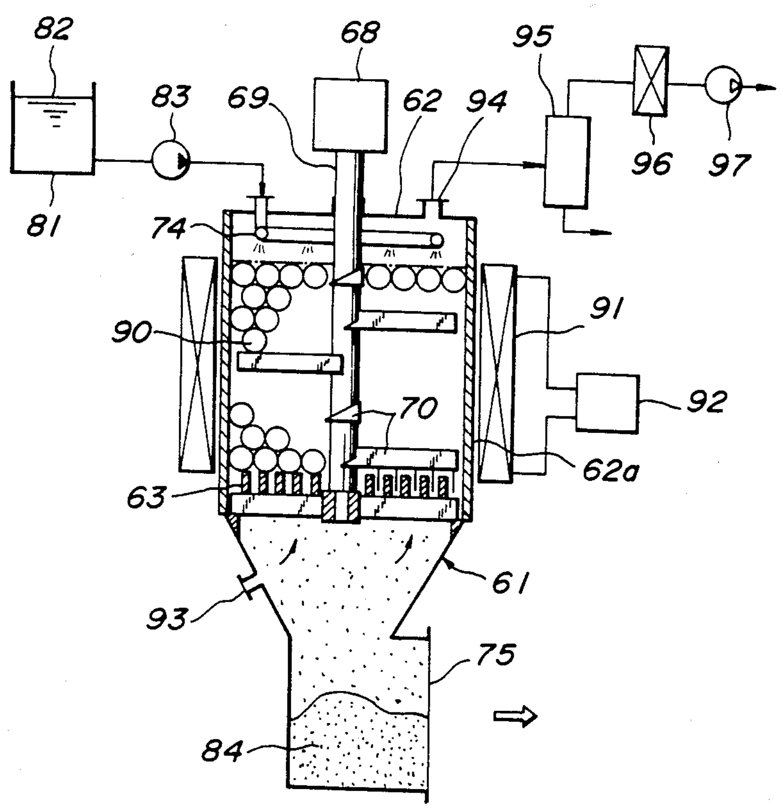
FIG. 9 is a sectional view of a fourth embodiment of the apparatus according to the invention.

FIG. 9 illustrates a further embodiment of the invention, which compises pins 72 for preventing the clogging of a support plate 63 and which is similar to the third embodiment with exception that spherical bodies 90 are made of a stainless steel and a barrel **62*a* of a main body 62 is made of a non-conductive material around which is arranged an induction heating coil 91 supplied with high-frequency current from a high-frequency generator 92 to heat the spherical bodies 90** by the induction heating as in the first embodiment.

As mentioned in the first embodiment, the apparatus according to the fourth embodiment operates with high thermal efficiency because of the induction heating capable of directly heating the spherical bodies 90, thereby obtaining a great treating capacity with a relatively small apparatus.

As in the above embodiments, the moisture evaporated as the liquid material 82 is dried is carried through an exhaust port 94 along with air sucked through an air supply port 93 at the lower portion of the main body 62 for removing the moisture and then condenses in a condenser 95 so as to be collected. The air from which the moisture has been removed is fed into the dust collector 96 in which the dust included in the air is removed. The air is then exhausted into the atmosphere by the exhaust fan 97.

In the above third and fourth embodiment, resistance heaters may be used for heating the piled layers of the spherical bodies instead of the hot air producing means 77 and the high-frequency heater 91. These embodiments can be applied to apparatuses for drying or powdering various kinds of liquid materials other than the radioactive wastes.

As can be seen from the above description, the apparatus for drying liquid materials is simple in construction and does not include rotating and sliding parts at high speeds, so that the apparatus does not fail and is easy to maintain. Moreover, the spherical conductors are generally made of a metal so as to permit a low temperature liquid material to contact the spherical conductors or bodies without any cracks due to difference in temperature. The spherical conductors or bodies slide and abut against each other and other parts of the apparatus to prevent the powder material from sticking and growing on the parts such as inner surfaces of the main body, the stirring blades, and spherical conductors or bodies themselves, thereby enabling the apparatus to continuously operate for a long period of time. Moreover, as the drying surface formed by a great number of the spherical conductors or bodies is remarkably wide and the spherical conductors or bodies are directly heated by the induction heating, the apparatus according to the invention operates with a high thermal efficiency and has a great treating capacity although it is of relatively small size.

This invention can be applied for the purpose of treating or drying various kinds of liquid materials to be powdered. In an application of this invention to the treatment of flowable radioactive wastes produced in plants for handling radioactive materials such as nuclear power stations, it is possible to treat the wastes by the apparatus fulfilling the first requirement of less failure and easy maintenance as a radioactive waste treating apparatus, thereby decreasing the risk of exposure to radioactive materials. Moreover, as the heating temperature can be raised in this invention, the radioactive waste liquids can be directly treated to be powdered prior to being enriched. In treating radioactive waste liquids consisting mainly of boric acid and sodium hydroxide produced in nuclear power stations employing pressurized water reactors, the liquids can be treated at temperatures in the widest temperature range determined by percentages of the components for drying and powdering the liquids, so that the percentages of the components can be freely selected in a wide range.

In accordance with the second embodiment of the invention, the spherical bodies piled on the support plate are heated in a desired distribution of temperature from the upper to lower portion of the main body corresponding to the respective zones of the heaters so as to prevent the spherical bodies from being cracked due to rapid cooling and to obtain the powder including the minimum moisture by supplying proper power input, thereby preventing the apertures or opening of the support plate from being clogged. When the apparatus is used for treating radioactive waste, particularly, it can continuously operate for a long period of time without requiring any troublesome maintenance, thereby reducing the risk of exposure to radioactivity.

In accordance with the third and fourth embodiments of the invention, there are provided the pins revolving in the concentric slits provided in the support plate to prevent the slits from being clogged, thereby enabling the apparatus to operate continuously for long periods of time so as to make easy the maintenance of the apparatus. Particularly, it can be effectively used for a radioactive waste treating apparatus so as to decrease the risk of exposure to radioactive materials.

It is further understood by those skilled in the art that the foregoing description is that of preferred embodiments of the disclosed apparatuses and that various changes and modifications may be made in the invention without departing from the spirit and scope thereof.

What is claimed is:

1. A liquid material drying apparatus comprising:

a vessel with a liquid material inlet port provided at an upper potion thereof for supplying a liquid material, and a dried powder outlet port provided at a lower portion thereof for delivering dried powder;

a support plate arranged in said vessel;

a great number of spherical bodies piled on said support plate;

liquid supply means provided above said spherical bodies within said vessel for spreading the liquid material onto the spherical bodies to dry the liquid material;

heating means for heating said spherical bodies;

stirring means including a driving shaft vertically extending above said support plate within said vessel and a plurality of stirring blades fixed to said driving shaft in horizontal directions for rolling said spherical bodies;

wherein said support plate is formed with slits concentric to each other about said driving shaft of said stirring means, and the lowermost stirring blade of said plurality of stirring blades has pins affixed thereto so as to extend into said slits and to rotate together with said lowermost stirring blade.

2. An apparatus as set forth in claim 1, wherein said stirring blades have upper surfaces downward tilted in their rotating directions.

3. An apparatus as set forth in claim 1 wherein said vessel is non-conductive, said spherical bodies are conductive, and heating means is an induction heating coil arranged around said vessel and supplied with high-frequency current from a high-frequency generator.

4. An apparatus as set forth in claim 1 wherein said vessel is conductive, said spherical bodies are non-conductive, and heating means is electric resistance heating means.

5. An apparatus as set forth in claim 4 wherein said electric resistance heating means comprises a plurality of electric resistance heaters arranged around said vessel and one above the other so as to heat zones of the spherical bodies corresponding to the respective heaters in different temperatures in a manner that the higher the zone of the spherical bodies, the lower is the temperature.

6. An apparatus as set forth in claim 1 wherein said heating means is hot air producing means for producing hot air which is supplied into said vessel through an air supply port provided in said vessel below said support plate and exhausted from an exhaust port provided in the upper portion of said vessel.

7. An apparatus as set forth in claim 1 wherein said support plate comprises a number of annular bodies having different diameters and arranged concentrically and equally spaced apart from each other to form a plurality of concentric slits therebetween, and a plurality of ribs connected to undersides of the annular bodies, and the lowermost stirring blade nearest to said support plate is provided with pins extending into said slits.

8. An apparatus as set forth in claim 1 wherein said slits have substantially the same widths in vertical directions.

9. An apparatus as set forth in claim 1 wherein said slits are downward widened slits.

10. An apparatus as set forth in claim 1 wherein said pins are fixed to the lowermost stirring blade so as to tilt downward in the rotating direction.

* * * * *